Nov. 26, 1957     O. KUMMER     2,814,775
FREQUENCY SETTING AND MEASURING SYSTEM
Filed March 19, 1954     3 Sheets-Sheet 1

INVENTOR
O. KUMMER
BY
Franklin Mohr
ATTORNEY

Nov. 26, 1957  O. KUMMER  2,814,775
FREQUENCY SETTING AND MEASURING SYSTEM
Filed March 19, 1954  3 Sheets-Sheet 2

INVENTOR
O. KUMMER
BY
Franklin Mohr
ATTORNEY

Nov. 26, 1957     O. KUMMER     2,814,775
FREQUENCY SETTING AND MEASURING SYSTEM
Filed March 19, 1954     3 Sheets-Sheet 3

INVENTOR
O. KUMMER
BY Franklin Mohr
ATTORNEY

United States Patent Office 2,814,775
Patented Nov. 26, 1957

2,814,775

FREQUENCY SETTING AND MEASURING SYSTEM

Oscar Kummer, Basking Ridge, N. J., assignor to Bell Telephone Laboratories, Incorporated, New York, N. Y., a corporation of New York Application March 19, 1954, Serial No. 417,474

1 Claim. (Cl. 324—79)

This invention relates to highly precise means and methods for measuring the frequency of a wave in terms of the frequencies of a plurality of sources of standard or reference frequency, or for setting up a wave generator or oscillator accurately to a desired frequency in terms of such standard sources.

It has been the practice to measure or set up a desired frequency accurately by using patterns developed on oscilloscopes or by means of other known types of beat indicators. The form of such patterns or beat indications has in the past depended upon the magnitude of the particular frequency to be measured or set up and as a result the oscilloscope or other indicator generally has had to be readjusted when changing from one frequency to another, particularly in order to be able to observe the difference between a rapidly moving pattern and a stationary or slowly moving pattern. It is well known in the art that synchronism between two waves is accurately and conveniently determined by bringing an oscilloscope pattern to rest or approximately so, or by tuning out audible beats.

In accordance with the present invention, the pattern or beat indication, whether visual or audible, is made substantially identical in form independently of the magnitude or order of magnitude of the frequency or frequencies involved.

By use of the invention it has been found feasible to measure, or to set an oscillator to, any frequency in a wide range, for example from 50 kilocycles to 20 megacycles with an accuracy of better than ±2 cycles per second.

A standard frequency source of pulses of base frequency say 10 kilocycles is provided and, in case it is desired to set up an oscillator to a specified frequency, then by means of any known form of beat indication, the oscillator is first set in synchronism with a harmonic of the base frequency. It is assumed that known means are provided to identify the ordinal number of the particular harmonic with which synchronism is effected. A calibrated interpolation oscillator is also provided and this is set to the desired frequency deviation, that is, to the desired frequency difference between the nearest harmonic frequency and the frequency to which it is desired to set the first mentioned oscillator. The oscillator to be set and the source of pulses are connected through a phase comparator to an oscilloscope or other beat indicator. In the case of the oscilloscope, the output of the phase comparator is impressed upon say the vertical deflection means of the oscilloscope while the output of the interpolation oscillator is impressed upon the horizontal deflection means. The oscillator to be set is then readjusted as required until a stationary or substantially stationary pattern is observed on the oscilloscope. The output frequency of the oscillator has thus been set to the desired frequency with an error no greater than the sum of the errors of the calibration oscillator and the harmonic of the standard source. Ambiguity as to whether the interpolation oscillator frequency has added to or been subtracted from the frequency of the harmonic may be resolved in known manner.

In the case where the unknown frequency of a given wave is to be measured, the source of the unknown wave is not adjusted but instead the interpolation oscillator is adjusted to produce the requisite stationary or substantially stationary pattern thereby determining the amount of the frequency deviation. Known means are available for identifying which harmonic is nearest the unknown frequency and to resolve ambiguity as to addition or subtraction.

Independence between the form of the pattern and the frequency to be set or measured is achieved by combining the wave of frequency to be set or measured with the train of standard pulses to produce a beating wave the form of which is independent of the ordinal number of the nearest harmonic in the pulse train, and then synchronizing this beating wave with a wave from the interpolation oscillator.

A particular form of phase comparator herein described which may be used as an element of the present invention is disclosed by this applicant jointly with E. P. Felch, Jr., and J. O. Israel in a copending application, Serial No. 417,475, filed March 19, 1954, Patent 2,808,-509, October 1, 1957, assigned to the same assignee as the present application.

Figure 10:
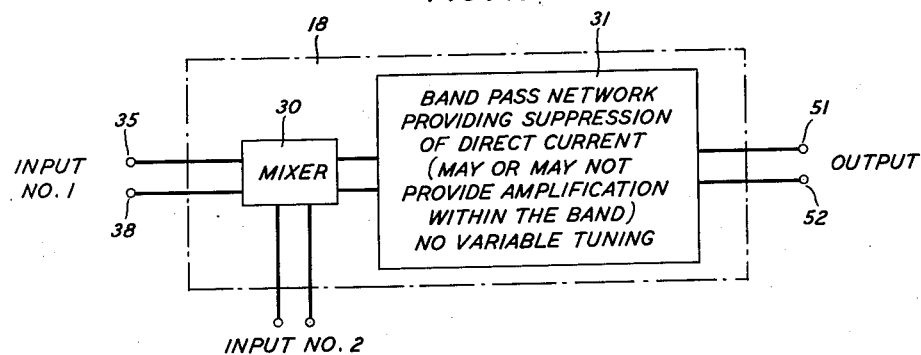
Fig. 10 is a block schematic diagram of a phase comparator suitable for combining a sinusoidal wave with a train or pulses to produce a beating wave for use in the system of Fig. 1.
Figure 11:
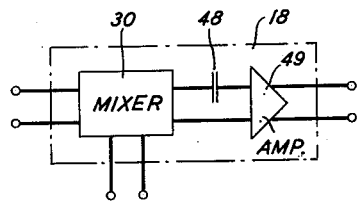
Figure 12:
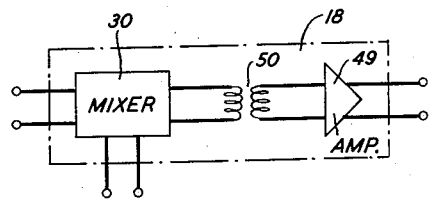
Figure 13:
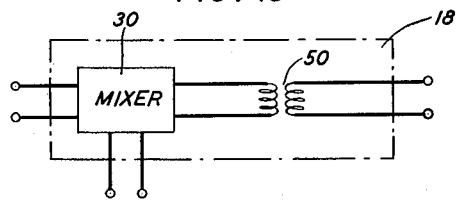
Figure 14:
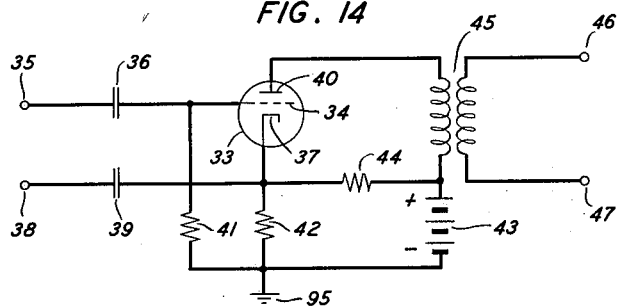
Figure 15:
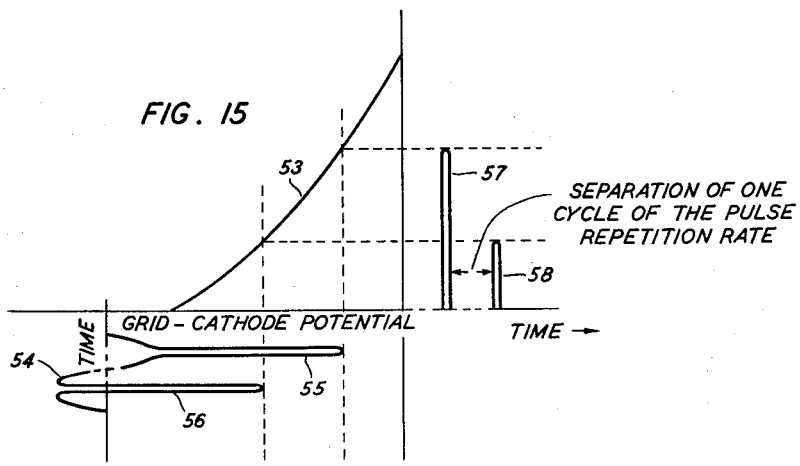
Figure 16:
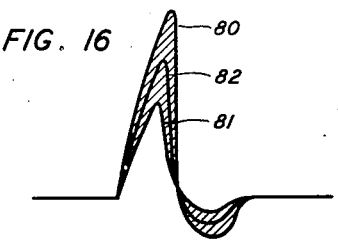

Figs. 11, 12, and 13 are schematic diagrams showing particular forms of the device of Fig. 10;

Fig. 14 is a schematic diagram of a mixer circuit suitable for use as a component part of any of the devices shown in Figs. 10 through 13;

Fig. 15 is a set of graphs useful in explaining the operation of the circuit of Fig. 14; and Fig. 16 is a sketch of pulse shapes such as may be generated in the circuit of Fig. 14 or other suitable mixer circuit.

Figure 1:
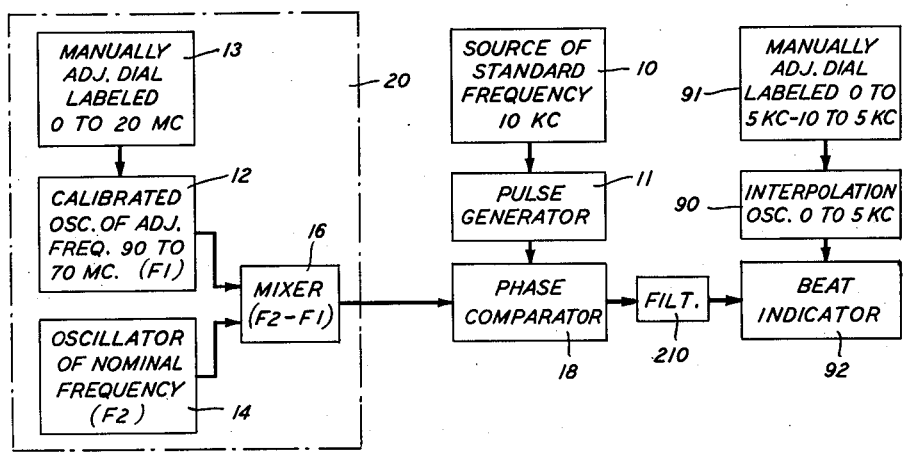
Fig. 1 is a block schmatic diagram of a frequency measuring and setting system in accordance with the invention.

Fig. 1 shows an arrangement for determining the frequency of a given wave with respect to any desired harmonic $NF$ of a relatively stable source 10 of standard frequency F. The source 10 actuates a pulse generator 11 of any suitable known form. The pulses produced by the generator 11 should be of very short duration, such for example as not longer than one four-thousandth of the periodic time of the fundamental frequency of the standard source where it is desired to utilize any one of as many as 2000 harmonics. More generally, if it is desired to utilize all harmonics up to the harmonic $NF$, the pulse duration should not exceed approximately one $2N$th of the period of the F frequency, that is, $$\frac{1}{2NF} \text{ second}$$

The source of the wave the frequency of which is to be determined may be an oscillator 20 of practically any type, or, as is found advantageous for many uses, and is illustrated in Fig. 1, a combination of two oscillators and a mixer for producing the sum or difference of the frequencies of the two oscillators. One oscillator 12 is of adjustable frequency, hereinafter designated F1, covering a desired frequency range which may be as wide as the range from F to the highest usable harmonic of the standard source. The range of the oscillator 12 is, however, preferably offset from the range starting at zero frequency, to reduce the percentage of frequency variation required. For example, where the highest usable harmonic is 20,000 kilocycles per second (for brevity usually stated as simply 20,000 kilocycles), the oscillator 12 may range from, say, 70 megacycles to 90 megacycles. A manually adjustable dial 13 or other suitable means is provided for setting the frequency of the oscillator 12 with at least a moderate degree of precision to any desired value. Another oscillator 14 of frequency to be designated F2 is provided to serve as the local or beating oscillator for oscillator 12.

The output terminals of the oscillators 12 and 14 are jointly connected to the input terminals of a mixer 16 of any known design for producing by the heterodyne principle an output wave equal in frequency to, for example, the difference frequency, $F2$ minus $F1$. For the purpose of accurately determining the frequency $F2-F1$, the output of the mixer 16 is fed to a phase comparator 18, illustrative forms of which are shown in Figs. 10, 11, 12, and 13, although other suitable forms may also be used. In the phase comparator 18, there is produced a potential of suitable amplitude to actuate a beat indicator 92 to which the output of the arrangement 18 is connected. The output wave of the phase comparator 18 is produced by the joint action of the output wave of frequency $(F2-F1)$ from the mixer 16 and pulses of standard frequency controlled by the source 10, which are impressed upon the phase comparator 18 from the pulse generator 11 as shown. The beat indicator 92 also has impressed upon its input a wave from an interpolation oscillator 90, the latter being provided with a conventional manually adjustable tuning dial 91.

In the operation of the system of Fig. 1, the frequency setting is compared to the source 10 of standard frequency supplemented by the variable interpolation oscillator 90 which latter covers one-half the relatively narrow frequency band between adjacent harmonics of the standard frequency, either adding or subtracting in frequency with respect to the nearest harmonic of the pulse repetition frequency. The mixer 16 combines the outputs of the oscillators 12 and 14 to produce the difference frequency to be set up or measured. It will be evident that the output of any kind of oscillator 20 may be substituted for the output of the mixer 16 at the input of the phase comparator 18. The output frequency from mixer 16 is compared in the phase comparator 18 with pulses from pulse generator 11 under the control of frequency standard 10. Here the frequency to be set up is approximated initially by means of the manual dial 13. The frequency deviation is observed by introducing an equal frequency offset from the interpolation oscillator 90. The frequency deviation is compared with the interpolation frequency by means of the beat indicator 92, which may be of a visual type such as a cathode ray oscilloscope or of an audible type such as a telephone receiver, or may constitute other comparator means. When the interpolation frequency differs from the deviation frequency by any interval other than the pulse repetition frequency F, or a multiple thereof, the pattern observed in an oscilloscope continually changes shape or position in known manner. When the two frequencies are equal or differ by F or a multiple thereof the pattern is stationary or audible beats observed in a telephone receiver disappear. The frequency at the output of the mixer 16 is determined as the nearest pulse harmonic plus or minus the interpolation frequency required to make the beats disappear or the oscilloscope pattern stationary. The range of frequencies impressed upon the beat indicator may be restricted to a bandwidth in the order of half the repetition frequency of the pulses, by any known means, of which a filter 210, connected between the phase comparator 18 and the beat indicator 92 is illustrative. The dial 13 may be calibrated to indicate the nearest pulse harmonic, while the interpolation oscillator may be directly calibrated. The zero reading of the interpolation oscillator may be offset by a multiple of F.

Although the calibration of the dial 13 need not be exceedingly precise, it is, however, necessary that precaution be taken to make sure that the harmonic indicated by the calibration on dial 13 will be the one desired, that is, $N$ and not some other harmonic such as for example $(N-1)$ or $(N+1)$. Taking as a numerical example a standard frequency F of 10 kilocycles, the harmonics are 10 kilocycles apart and it is found in practice that the calibration of dial 13 must be accurate to within about three kilocycles in order to select the desired harmonic without mistake.

It should be noted that ambiguity is present, especially in the vicinity of cardinal points and midway between them, i. e., there is no indication whether it is addition or substraction that is taking place. The interpolation oscillator 90 preferably covers a range of ½ F, or five kilocycles in the numerical case considered. This range may have a frequency offset so as actually to cover 10 to 15 kilocycles, for example, or in general $NF \pm \frac{1}{2} F$. The ambiguity may be resolved by a sufficiently refined calibration of the dial 13. Alternatively, the ambiguity may be resolved by making a small change of known sense in the frequency of either oscillator 12 or oscillator 90 and observing in which sense the frequency of the other one of these oscillators must be changed to restore the zero beat condition.

The dial 91 may be labeled in terms of deviation frequency rather than actual frequency. Where the pulse repetition rate is 10,000 cycles, the dial may bear two sets of labeled frequencies, one running from zero up to 5000 cycles and the other running from 10,000 cycles down to 5000. The former scale is applicable when the deviation frequency is to be added to the nearest harmonic frequency. The latter scale is used when the deviation frequency is actually to be subtracted from the nearest harmonic frequency but for convenience, the scale reading, between 5000 cycles and 10,000 cycles is to be added to the next lower harmonic frequency. Known methods are applicable to indicate which scale is to be used in a given circumstance.

It is advantageous to use two oscillators such as 12 and 14 and a mixer 16 to supply the desired wave rather than a single oscillator, in that the limits of the frequency range of the calibrated oscillator may be placed in a favorable portion of the frequency spectrum, this being a well known advantage inherent in heterodyne oscillators. A single oscillator tunable over a range from 10,000 to 20 million cycles per second is more difficult to build and to calibrate precisely than one, for example tunable from 70 megacycles to 90 megacycles per second. When oscillator 12 covers the latter range, a suitable nominal value of F2 is 90 megacycles per second.

Figure 2:
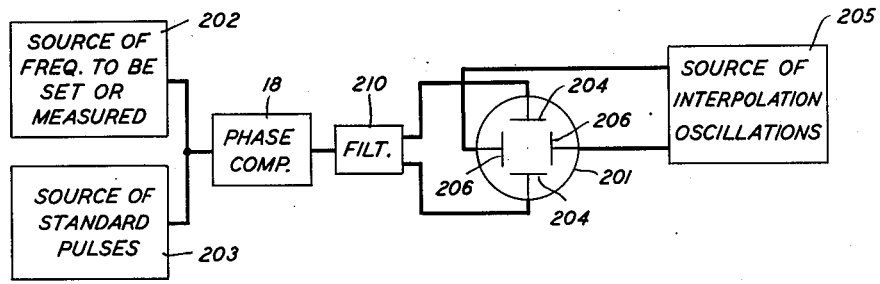
Fig. 2 is a simplified schematic diagram of a system of the type shown in Fig. 1, employing a cathode ray oscilloscope as a beat indicator.

Fig. 2 is a simplified schematic diagram of the system of Fig. 1, particularized to show a cathode ray oscilloscope 201 as the beat indicator 92. The source of frequency to be set or measured is represented by a block 202 which is connected to the phase comparator 18 together with the source of standard pulses, the latter source being represented by a block 203. The output of the phase comparator 18 is connected to one of the deflecting means of the oscilloscope 201, illustrated as a conventional pair of vertical deflection plates 204. The source of interpolation oscillations is represented by a block 205 which is connected to a second deflecting means of the oscilloscope 201, illustrated as a conventional pair of horizontal deflection plates 206.

The pattern which results and is observable upon the screen of the oscilloscope 201 is composed of a plurality of pulse shapes of the kind illustrated in Fig. 16, from a few pulses up to the limit of the number of successive pulses that occur within the time limit of persistence of vision, including any persistence of images upon the screen itself. When a rational relationship exists between the interpolation frequency and the pulse repetition frequency, superposition of pulse images may occur and for a small frequency ratio the number of separate pulses seen may be small. When the frequency relationship is irrational or if the frequency ratio is large, many separate images may appear or the pattern may have a distinct envelope filled in with many pulse images crowded together too closely to be distinguished separately.

Whenever the deviation frequency and the interpolation frequency are unequal, the pattern in the oscilloscope will move as a whole, moving horizontally and capable of being slowed as these two frequencies approach equality. When the frequency difference is great the motion of the pattern is rapid and blurring may result.

When the frequency to be set or measured differs from an integral multiple of the pulse repetition frequency, the detected pulses coming from the phase comparator vary in amplitude at the deviation frequency, as will be verified mathematically hereinafter.

The frequency to be set or measured may be compared with the nearest harmonic of the standard pulse repetition rate in any known manner, as by beats, visual or audible. The ordinal number of the nearest harmonic may be determined from the approximate calibration of the source oscillator, or by any other method, of which several are well known in the art. It is convenient to observe these beats in the oscilloscope 201, in which case the interpolation source 205 may have any random setting, the function of the latter source in this case being merely to spread the pattern horizontally on the screen. Source 205 may even be turned off and the vertical motion of the oscilloscope beam observed to detect the beats.

To set the dial 13, the calibration may be used to effect a coarse adjustment. The dial 13 may then be further adjusted to reduce the vertical pulsations of the pattern on the oscilloscope. As resonance is approached, the vertical motion in the pattern becomes slower and slower and may even be stopped. By thus slowing down the pattern to any desired degree, the oscillator may be accurately tuned to the nearest pulse harmonic.

The oscillator frequency may then be set up at a desired frequency by setting the frequency of the interpolation oscillator to the desired deviation frequency and adjusting the oscillator with the aid of the oscilloscope to slow down or substantially stop any horizontal movement of the pattern.

Alternatively the frequency deviation of the oscillator may be determined by adjusting the frequency of the interpolation oscillator to slow down or substantially stop the horizontal movement of the pattern as before.

When the horizontal movement of the pattern is slowed to as little as say two excursions per second it is evident that the frequency comparison is accurate to plus or minus two cycles per second, whatever may be the oscillator frequency within the entire operating band of the system, e. g. from 50,000 cycles to 20 megacycles. This degree of accuracy is usually readily obtainable in practice.

Figure 3:
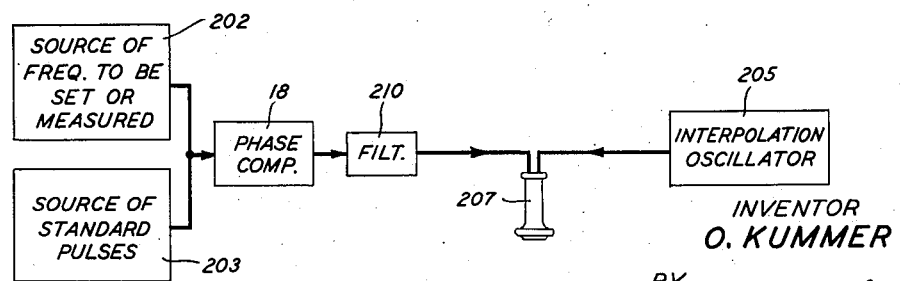
Fig. 3 is similar to Fig. 2 but shows the use of a telephone receiver as a beat indicator.

In Fig. 3, a telephone receiver 207 replaces the oscilloscope of Fig. 2 for audible observation of beats. Within the audible range of the interpolation oscillator, a steady tone of the interpolation oscillator frequency may be heard in the receiver 207. When the deviation frequency and the interpolation frequency are close together, beats will be observed in the form of fluctuations in the intensity of the tone of interpolation frequency. Near exact resonance the tone again becomes steady or nearly so, and its intensity depends upon the particular phase relationship between the beating components when resonance occurs. Beats between the frequency to be set or measured and the standard pulses may also be observed by means of the receiver 207 in the neighborhood of resonance. In the system of Fig. 3 as in the system of Fig. 2, the form of the beat indication does not depend upon the absolute value of the frequency being measured. The frequency heard is always mainly the deviation frequency and this remains always between zero and one-half the pulse repetition frequency.

Figure 4:
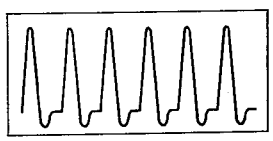
Figs. 4 through 9 are sketches illustrating types of patterns observable on an oscilloscope to indicate beats.
Figure 5:
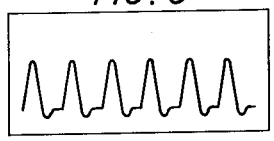
Figure 6:
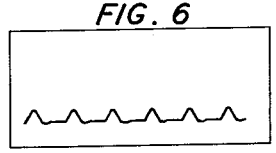

Figs. 4, 5, and 6 show a series of typical patterns such as may be observed in the oscilloscope and which exhibit vertical pulsations, as may be used to tune to a pulse harmonic. Near resonance the phase difference between the beating waves approaches a nearly constant phase relationship with time, as indicated by uniform height of the pulses at any particular instant.

Figure 7:
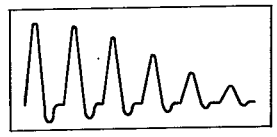
Figure 8:
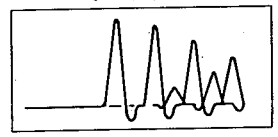
Figure 9:
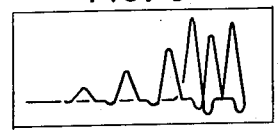

Figs. 7, 8, and 9 show a series of typical patterns which exhibit horizontal motion of the pattern as a whole, as may be used to set or to determine the deviation frequency. As the critical frequency is approached, the horizonal motion of the pattern becomes slower and slower. The vertical pulsations may at the same time be more or less rapid depending upon the deviation frequency and may be so rapid that the eye cannot follow them. This, however, does not interfere with the observation of the horizontal movement of the pattern.

In the arrangement of Fig. 10 the combination of a mixer 30 and an aperiodic network 31 (which may include an amplifier) illustrates a preferred form of the phase comparator 18, which may be used to compare the phase of a sinusoidal wave coming in from any source with the phase of pulses applied to the device from a pulse generator. Examples of aperiodic networks are: substantially purely resistive networks; networks of the band pass type; so called broad band networks; and other networks or circuits of this general type which are known to those skilled in the art, and which have no stringent requirements as to discrimination against nearby frequencies. The phase comparator is of the general type disclosed in the joint patent, supra, but requires no rectifier, since an alternating component of the output is utilized. The device 18 develops a wave that varies in amplitude in response to any change of phase relationship between the sinusoidal wave and the pulse. When there is no frequency deviation between the wave and a harmonic of the pulse, the phase relationship between the two is constant, i. e., resonance is indicated. Thus, the control wave ceases to vary in amplitude and assumes a steady value dependent upon the particular phase difference between the sinusoidal wave and the nearest pulse harmonic frequency.

Particularizations of the arrangement of Fig. 10, shown in Figs. 11, 12, and 13, illustrating various means for suppressing direct current and establishing a definite lower cut-off frequency in the network 31, will be discussed in detail hereinafter, following a description of the mixer 31.

Various suitable mixing circuits are known in the art, one being selected for illustration in detail in Fig. 14 comprising a triode tube 33 with one input applied to the control grid 34 between ground 95 and an input terminal 35 through a coupling condenser 36. The other input is applied to the cathode 37 between ground 95 and an input terminal 38 through a coupling condenser 39. A grid leak 41, a cathode load resistor 42, and an anode potential supply source 43 are provided in conventional manner. A cathode bias is provided through a grid bias regulating resistor 44 as shown. An output transformer 45 is connected with its primary winding between the anode 40 and the positive terminal of the anode potential supply source 43. The secondary winding of the transformer 45 is connected to a pair of output terminals 46 and 47.

Fig. 15 helps to explain a preferred method of operating the mixer of Fig. 14, whereby the sinusoidal signal wave is suppressed in the output. The curve 53 illustrates the anode current vs. grid-cathode potential characteristic of the tube 33. It is assumed that by means of proper proportioning of the resistors 42 and 44 in Fig. 14 the grid-cathode circuit is biased beyond cut-off, and sufficiently so that the impressed signal wave, represented by curve 54, produces no anode current in the absence of pulses. The pulses, when applied, are superimposed upon the signal current and may occur in general at any phase of the signal wave, as for example as shown at 55 and 56, respectively, the former being shown arising from a positive peak and the latter from a negative peak of the signal wave. The resulting anode current comprises pulses 57 and 58, respectively, which are essentially free from any component of the signal wave 54. In actual practice, the pulses 55, 56 are spaced apart at time intervals equal to full cycles of the standard frequency, for example, 10 kilocycles. Whether a given pulse is superimposed upon a positive peak, a negative peak, or upon some other portion of the signal wave depends upon the phase relationship between the pulse train and the signal wave. While pulses 55 and 56 are shown adjacent in Fig. 8, for economy of space, in practice the succeeding pulses will be spaced apart by one or more, up to 2000 or more cycles of the signal wave, being used in the figure to indicate an interval or intervals between pulses. The output pulses will always occur with the repetition rate of the standard frequency, for example 10 kilocycles, whatever the frequency of the signal wave.

While the particular form of mixer shown in Fig. 14 operated as shown by Fig. 15 illustrates very clearly the independence of the mixer output wave with respect to the particular harmonic which is closest to the frequency of the signal wave, it may also be shown that a control wave having such independence is present as a component part of the output wave from other sorts of mixers and by other methods of mixer operation. In any form of mixing device in which modulation occurs, such a control wave is present and may be selected and utilized.

In the example employing a pulse with a repetition rate of 10,000 per second, the pulse derived from the standard source contains components comprising all the multiples of 10,000 cycles per second up to say, 20 megacycles per second. The pulse is assumed so short that all the harmonics are of essentially the same intensity. Converting for convenience to kilocycles, the pulse contains components that are multiples of 10 kilocycles up to 20,000 kilocycles. Suppose that the frequency to be determined (herein sometimes called the signal wave) is, for example, 1000 kilocycles. Then some of the frequency components of the pulse in kilocycles in the neighborhood of 1000 kilocycles are 940, 950, 960, 970, 980, 990, 1000, 1010, etc.

The modulation frequencies that are produced in the mixer and that are significant here are the sum and difference frequencies. Of these, the sum frequencies are all too high to pass through the coupling circuits that are provided as hereinafter described, an upper cut-off frequency of say 150 kilocycles being suitable. Some of the difference frequencies in kilocycles are −60, −50, −40, −30, −20, −10, 0, +10, +20, +30, +40, +50, +60, etc. Here, the minus sign indicates that the pulse component which produces the difference frequency is lower in frequency than the signal wave. Similarly, the plus sign indicates that the pulse component is higher in frequency than the signal wave. In addition these frequencies also have a definite phase relation with respect to each other, in that all components of the pulse have a maximum value at the same time as the peak of the pulse. Since all the pulse components are assumed of equal intensity and are modulated with the same signal frequency, the shape of the output wave from the mixer is generally similar to that of the input wave (original pulse). The fact that fewer harmonics are included in the output wave than are present in the input wave is of course responsible for some more or less material changes in wave shape. However, the shape of the output wave is independent of the particular harmonic that is closest in frequency to the signal wave, the same as in the case of the mixer shown in Fig. 14. The amplitude of the new pulse is related to the product of the original pulse magnitude, the magnitude of the wave of signal frequency, and to one more factor next to be defined.

Consider now the combinations of components that can produce a 10 kilocycle difference frequency. There are two, namely 990 kilocycles and 1010 kilocycles, resulting in an output component proportional to $$\tfrac{1}{2} \cos [(2\pi \cdot 10 \text{ kc.})t - \theta] + \tfrac{1}{2} \cos [(2\pi \cdot 10 \text{ kc.})t + \theta]$$
$$= \cos \theta \cos [(2\pi \cdot 10 \text{ kc.})t] \quad (1)$$

where $\theta$ is the phase difference in degrees between the 1000 kilocycle wave and the 1000 kilocycle component of the pulse.

Similarly there are two combinations that result in a 20 kilocycle difference frequency, namely, 980 kilocycles and 1020 kilocycles, resulting in an output component proportional to $$\tfrac{1}{2} \cos [(2\pi \cdot 20 \text{ kc.})t - \theta] + \tfrac{1}{2} \cos [(2\pi \cdot 20 \text{ kc.})t + \theta]$$
$$= \cos \theta \cos [(2\pi \cdot 20 \text{ kc.})t] \quad (2)$$

There will be a similar output component for each multiple of 10 kilocycles up to the upper cut-off frequency of the amplifier. The same angle $\theta$ appears in each term. Consequently, $\cos \theta$ is a factor of the expression for the new pulse.

Since $\cos \theta$ can range in value between plus one and minus one, the new pulse can range between a maximum positive value and a maximum negative value. However, the new pulse is superimposed upon the original pulse which may be larger than the new pulse in which case the two are directly in phase with each other and generally similar in shape. Hence the resultant pulse varies in height as illustrated in Fig. 16 between two positive values as long as resonance does not obtain. Curve 80 represents the pulse of maximum height and curve 81 the pulse of minimum height. The pulse varies in height at a rate equal to the frequency difference between the signal wave and the nearest harmonic component of the pulse as will be verified mathematically hereinafter. In an oscilloscope a solid pattern appears between curves 80 and 81 as indicated by cross hatching in Fig. 16. When exact resonance occurs the pulse height ceases to vary but assumes a value dependent upon $\cos \theta$, which in turn depends upon the phase difference between the resonating waves. Curve 82 of Fig. 16 illustrates the pulse when exact resonance exists. The wave forms of Fig. 16 are representative of the output of the mixer of Fig. 14 as well as of mixers in general.

The output wave of the mixer is modified by the network 31 with or without accompanying amplification.

It can be verified mathematically as follows that where the frequency to be determined is not a harmonic of the pulse frequency, the amplitude of the output pulse from the mixer varies at the rate of deviation frequency between the frequency to be determined and the nearest harmonic of the pulse frequency.

As a numerical example, take $(1000+\Delta)$ kilocycles as the oscillator frequency and 10 kilocycles as the pulse repetition frequency. The modulation products appearing in the output of the mixer are then of the type:

$$[\cos 2\pi(1000 \text{ kc.} + \Delta \text{ kc.})t$$
$$+ \cos 2\pi(980 \text{ kc.})t + \cos 2\pi(990 \text{ kc.})t$$
$$+ \cos 2\pi(1000 \text{ kc.})t + \cos 2\pi(1010 \text{ kc.})t$$
$$+ \cos 2\pi(1020 \text{ kc.})t + \ldots] \quad (3)$$

Developing some of the product terms of (3) each separately gives $$[\cos 2\pi(1000 \text{ kc.} + \Delta \text{ kc.})t][\cos 2\pi(990 \text{ kc.})t]$$
$$= \tfrac{1}{2} \cos 2\pi(1990 \text{ kc.} + \Delta \text{ kc.})t +$$
$$\tfrac{1}{2} \cos 2\pi(10 \text{ kc.} + \Delta \text{ kc.})t \quad (4)$$

$$[\cos 2\pi(1000 \text{ kc.} + \Delta \text{ kc.})t][\cos 2\pi(1000 \text{ kc.})t]$$
$$= \tfrac{1}{2} \cos 2\pi(2000 \text{ kc.} + \Delta \text{ kc.})t +$$
$$\tfrac{1}{2} \cos 2\pi(\Delta \text{ kc.})t \quad (5)$$

$$[\cos 2\pi(1000 \text{ kc.} + \Delta \text{ kc.})t][\cos 2\pi(1010 \text{ kc.})t]$$
$$= \tfrac{1}{2} \cos 2\pi(2010 \text{ kc.} + \Delta \text{ kc.})t +$$
$$\tfrac{1}{2} \cos 2\pi(-10 \text{ kc.} + \Delta \text{ kc.})t \quad (6)$$

and so forth. The network 31 cuts off the summation terms leaving only the difference terms, for example, $$\tfrac{1}{2} \cos 2\pi(20 \text{ kc.} + \Delta \text{ kc.})t + \tfrac{1}{2} \cos 2\pi(-20 \text{ kc.} + \Delta \text{ kc.})t$$
$$+ \tfrac{1}{2} \cos 2\pi(10 \text{ kc.} + \Delta \text{ kc.})t + \tfrac{1}{2} \cos 2\pi(-10 \text{ kc.} + \Delta \text{ kc.})t$$
$$+ \tfrac{1}{2} \cos 2\pi(\Delta \text{ kc.})t + \ldots \quad (7)$$

These terms fall into pairs as indicated in (7) and may be transformed into products:

$$[\cos 2\pi(\Delta \text{ kc.})t][\cos 2\pi(20 \text{ kc.})t]$$
$$+ [\cos 2\pi(\Delta \text{ kc.})t][\cos 2\pi(10 \text{ kc.})t]$$
$$+ \ldots + \tfrac{1}{2} \cos 2\pi(\Delta \text{ kc.})t$$
$$= [\cos 2\pi(\Delta \text{ kc.})t][\tfrac{1}{2} + \cos 2\pi(10 \text{ kc.})t +$$
$$\cos 2\pi(20 \text{ kc.})t + \ldots] \quad (8)$$

The expression (8) will again be recognized as a pulse of the same periodicity as the original pulse, and in phase with the original, but having an amplitude that varies periodically at the rate of Δ kc., the frequency of deviation of the oscillator from the nearest harmonic of the original pulse.

It will be noted that each pair of components in the original pulse contributes to the modulation products that make up the new pulse, up to the limit of the pass band of the network 31. Thus, the broader the pass band the greater the height (voltage) of the new pulse and the stronger the control current, other things being equal. The noise increases in power in proportion to increased band-width, but the voltage due to the noise increases only as the square root of the bandwidth. There is obtained therefore an improvement in the signal to noise ratio by increasing the bandwidth to include more harmonics. This advantage is not found in prior art systems where a narrow band (restricted at best to a single interval between adjacent harmonics) is required in separating one harmonic from another. In the system of the invention the amplifier or network 31 bandwidth may be many times the interval between adjacent harmonics and is the same regardless of which harmonic is being used to detect frequency synchronism.

The direct current output of the mixer, while it constitutes a current which is proportional to the term $\cos \theta$, is preferably excluded as by a blocking condenser or a transformer or other means in the systems of the present invention. Instead, the plurality of alternating current modulation products is used as hereinabove described with attendant improvement in signal-to-noise ratio.

It will be evident from the preceding description that an important consideration in extending the number of harmonic components that can be utilized for synchronization is the signal-to-noise ratio. Of the circuit elements shown in Fig. 10, the mixer 30 usually has the highest noise level. Direct current amplifiers, if used, are also a source of very high level noise. Alternating current amplifiers (with upper and lower cut-off frequencies) as may be used in the present invention, however, are relatively free from noise.

If it is desired to use only 200, say, of the harmonics of the base frequency, the pulse width for best results may have a maximum value of not more than about one four-hundredths of a cycle of the pulse repetition frequency. With a given height of pulse, the energy content of the pulse is limited, the energy being proportional to the product of the width and height. As the noise energy introduced by the mixer 30 is fixed independently of the pulse, the signal-to-noise ratio for the mixer is thus dependent upon the number of harmonic components to be utilized. If the signal-to-noise ratio is too low, the indication of synchronization will be obscured.

If it is desired to utilize, for example, 2000 harmonics instead of 200, the pulse width will have to be reduced to one-tenth the former value. The energy content of the pulse will be reduced also to one-tenth, and, as the noise introduced by the mixer 30 is the same as before, the signal-to-noise ratio is necessarily degraded by a factor of ten.

It is found, however, that the noise introduced by the mixer 30 into the direct current component of the mixer output is very great relatively to the noise introduced into the alternating current components. The direct current component of the mixer output is preferably blocked out from the succeeding circuits, only the alternating current components being passed along. The elimination of the direct current component at this stage results in a considerable increase in the signal-to-noise ratio. The pulse train with the direct current component removed is advantageously amplified in alternating current amplifiers, which, as stated above, are relatively noise-free. After sufficient amplification, the pulse train may be filtered as in filter 210 to produce a broadened type of pulse for use in the frequency determination. At this stage it is no longer advantageous to retain the narrow pulse width, as the essential information needed is the deviation frequency and this appears as amplitude modulation of the pulse and occurs at a rate always no greater than half the pulse repetition frequency.

As a result of applying the above principles of protection against introduction of excessive noise and other precautions herein described, the system of the invention has been made capable of synchronization with any one of 2000 or more harmonics of the base frequency.

With particular reference to the improvement in signal-to-noise ratio as affected by the band limits of the network 31 and associated amplifiers, if any, attention is again directed to Fig. 10, wherein the mixer 30 is connected to the aperiodic network 31, which may or may not provide amplification as desired. The network 31 does provide suppression of direct current by any suitable means. A feature of the network 31 is that there is no manual adjustment and no variable tuning required. The network, which is preferably broad band, passes a frequency interval several times as wide as the interval between adjacent harmonics of the standard frequency. A bare minimum bandwidth would include at least two harmonics, one odd and one even, e. g., 10 and 20 kilocycles or 30 and 40 kilocycles. The filter 210 may have an upper cut-off frequency of about five kilocycles.

Various arrangements for suppressing the direct current component and establishing a definite lower cut-off frequency in the network 31 are shown in Figs. 11, 12, and 13, respectively.

Fig. 11 shows the network 31 particularized in the form of a blocking condenser 48 and an (alternating current) amplifier 49.

Fig. 12 shows the blocking condenser 48 as replaced by a transformer 50, which may be the output transformer 45 of the mixer as shown in Fig. 14.

Fig. 13 shows the same system as shown in Fig. 12 except that the amplifier 49 is omitted. This arrangement is feasible, for example, where the beat indicator 92 is voltage-actuated and the transformer 50 can be made to supply a sufficient amount of voltage step-up to operate the indicator without the aid of an amplifier.

Amplification when employed, as in amplifier 49, is advantageously applied in two or more separate stages with signal shaping means inserted between stages as may be required to correct for wave shape distortion in the amplifying stages, in accordance with known techniques. Therefore, no detailed disclosure of amplifier 49 is deemed necessary.

It is important that, where amplification is required in order to secure a sufficiently strong output wave, the amplification is preferably applied after rather than before the mixer. If applied ahead of the mixer, the amplification must extend over the whole frequency band to be covered, up to and including the highest harmonic that is to be utilized. In the numerical example herein given this means an upper cut-off frequency of at least 20 megacycles, which places very severe requirements upon the amplifier. If the amplification is applied between the mixer and the detector on the other hand, the frequency band required is much less, and amplifiers of suitably wide bandwidth are readily obtainable. In the system described herein the bandwidth may be, for example, 150 kilocycles. Sufficient gain with good stability may be obtained over a bandwidth of this order of magnitude to meet the requirements of the system of the invention using known amplifier design.

Output terminals 51 and 52 are shown connected to the network 31.

The operation of the system of Fig. 10 as well as that of other embodiments of the invention is the same regardless of which harmonic the signal wave most nearly approaches in frequency. Furthermore, the output from the system is substantially the same in all cases over the whole range of 2000 or more harmonics. No manual tuning of the network 31 nor of any portion of the phase comparator is required when going from one harmonic to another.

No expansion of the pattern in the horizontal direction is required to enable the detailed shape of the pattern to be examined at the higher frequencies. In fact, no readjustment of the pattern is needed in changing from one frequency of interest to another, as the patterns remain substantially unchanged in shape and amplitude at all frequencies within the useful range.

It is to be understood that the above described arrangements are illustrative of the principles of the invention and are not to be construed as limiting. Other arrangements within the spirit and scope of the invention may be readily devised by those skilled in the art.

What is claimed is:

A broad band frequency determining system for setting or measuring the frequency of a wave in terms of the frequency difference between the said wave and that harmonic component of a train of pulses of known fundamental frequency which is nearest in frequency to said wave, comprising a source of a pulse train supplying pulses of duration of the order of one-half the period of the harmonic component nearest in frequency to the highest frequency which the system is designed to determine, a modulator, an output circuit therefor, a broad band input circuit therefor which is capable of passing the entire band of frequencies to be determined, said pulse train source being connected to said broad band input circuit to impress a train of said pulses thereon, means to impress upon said broad band input circuit a wave the frequency of which is to be determined, and beat frequency measuring means connected to said modulator output circuit to measure a beat frequency produced by the wave to be determined beating with a plurality of harmonics of the known fundamental frequency.

References Cited in the file of this patent

UNITED STATES PATENTS

| | | |
|---|---|---|
| 2,321,315 | Peterson | June 8, 1943 |
| 2,393,856 | Collins | Jan. 29, 1946 |
| 2,686,294 | Hower | Aug. 10, 1954 |
| 2,763,836 | Bullock | Sept. 18, 1956 |

FOREIGN PATENTS

| | | |
|---|---|---|
| 1,071,458 | France | Mar. 3, 1954 |